United States Patent
Steinmeyer et al.

(10) Patent No.: US 9,583,801 B2
(45) Date of Patent: Feb. 28, 2017

(54) BATTERY TEMPERATURE REGULATING SYSTEM

(71) Applicant: Honda Motor Co., Ltd., Tokyo (JP)

(72) Inventors: Christopher Leonard Steinmeyer, Hilliard, OH (US); Deryk Baker, Delaware, OH (US); Robert Settles, Jr., Sunbury, OH (US); Charles Richard Owens, Jr., Powell, OH (US); Duong Hoang Vu, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 302 days.

(21) Appl. No.: 14/314,191

(22) Filed: Jun. 25, 2014

(65) Prior Publication Data

US 2015/0380781 A1  Dec. 31, 2015

(51) Int. Cl.
| | |
|---|---|
| *H01M 10/625* | (2014.01) |
| *H01M 10/48* | (2006.01) |
| *H01M 10/613* | (2014.01) |
| *H01M 10/615* | (2014.01) |
| *H01M 10/63* | (2014.01) |
| *B60L 11/18* | (2006.01) |
| *H01M 10/6563* | (2014.01) |
| *H01M 10/651* | (2014.01) |

(52) U.S. Cl.
CPC ....... *H01M 10/625* (2015.04); *B60L 11/1874* (2013.01); *H01M 10/486* (2013.01); *H01M 10/63* (2015.04); *H01M 10/6563* (2015.04); *H01M 10/651* (2015.04); *H01M 2220/20* (2013.01)

(58) Field of Classification Search
None
See application file for complete search history.

(56) References Cited

U.S. PATENT DOCUMENTS

| | | | |
|---|---|---|---|
| 1,338,690 | A | 5/1920 | Moorman |
| 2,104,765 | A | 1/1938 | Saunders |
| 2,104,767 | A | 1/1938 | Saunders |
| 2,104,772 | A | 1/1938 | Saunders |
| 2,104,773 | A | 1/1938 | Saunders |
| 2,106,883 | A | 2/1938 | Black |

(Continued)

FOREIGN PATENT DOCUMENTS

| | | | |
|---|---|---|---|
| FR | 2865070 | 7/2005 | |
| FR | 2865070 A1 * | 7/2005 | ......... B60H 1/00278 |

(Continued)

*Primary Examiner* — Daniel Gatewood
(74) *Attorney, Agent, or Firm* — Rankin, Hill & Clark LLP

(57) ABSTRACT

A temperature regulating system for regulating the temperature of a battery in a vehicle. The system regulates airflow to the battery for cooling or warming the battery based on the speed of the vehicle and the temperature of the battery. The system provides active cooling airflow to the battery when the battery temperature is above a recommended temperature range, or when the battery temperature is within the recommended temperature range and the speed of the motor vehicle is below a speed threshold. The system provides passive cooling airflow when the battery temperature is within the recommended temperature range and the speed of the motor vehicle is above a speed threshold. The system provides active warming airflow when the battery temperature is below the recommended temperature range.

13 Claims, 2 Drawing Sheets

(56) References Cited

U.S. PATENT DOCUMENTS

| | | |
|---|---|---|
| 2,133,577 A | 10/1938 | Saunders |
| 4,135,593 A | 1/1979 | Fowkes |
| 4,858,565 A | 8/1989 | King |
| 5,082,075 A | 1/1992 | Karolek et al. |
| 5,215,834 A | 6/1993 | Reher et al. |
| 5,320,190 A | 6/1994 | Naumann et al. |
| 5,390,754 A | 2/1995 | Masuyama et al. |
| 5,392,873 A | 2/1995 | Masuyama et al. |
| 5,432,026 A | 7/1995 | Sahm et al. |
| 5,490,572 A | 2/1996 | Tajiri et al. |
| 5,542,489 A | 8/1996 | Allison et al. |
| 5,585,204 A | 12/1996 | Oshida et al. |
| 5,834,132 A | 11/1998 | Hasegawa et al. |
| 6,188,574 B1 | 2/2001 | Anazawa |
| 6,230,677 B1 | 5/2001 | Setsuda |
| 6,372,378 B1 | 4/2002 | Warner et al. |
| 6,547,020 B2 | 4/2003 | Maus et al. |
| 6,662,891 B2 | 12/2003 | Misu et al. |
| 6,892,713 B2 | 5/2005 | Criddle et al. |
| 7,025,159 B2 | 4/2006 | Smith et al. |
| 7,048,321 B2 | 5/2006 | Bandoh et al. |
| 7,051,825 B2 | 5/2006 | Masui et al. |
| 7,079,379 B2 | 7/2006 | Yamaguchi et al. |
| 7,384,704 B2 | 6/2008 | Scott |
| 7,500,512 B2 | 3/2009 | Hasegawa et al. |
| 7,511,455 B2 | 3/2009 | Yoneda |
| 7,635,040 B2 | 12/2009 | Seo et al. |
| 7,654,351 B2 | 2/2010 | Koike et al. |
| 7,688,582 B2 | 3/2010 | Fukazu et al. |
| 7,735,331 B2 | 6/2010 | Zhu et al. |
| 7,905,307 B2 | 3/2011 | Kubota et al. |
| 7,905,308 B2 | 3/2011 | Abe et al. |
| 7,947,387 B2 * | 5/2011 | Saito .................. B60L 1/003 429/61 |
| 7,971,447 B2 | 7/2011 | Maitre |
| 8,104,435 B2 | 1/2012 | Schwartz et al. |
| 8,167,070 B2 | 5/2012 | Takamura et al. |
| 8,232,886 B2 | 7/2012 | Kawai et al. |
| 8,258,726 B2 | 9/2012 | Okuda et al. |
| 2003/0226653 A1 | 12/2003 | Takedomi et al. |
| 2004/0065491 A1 | 4/2004 | Dudley et al. |
| 2004/0094115 A1 | 5/2004 | Jatzke et al. |
| 2004/0261377 A1 | 12/2004 | Sung |
| 2007/0072061 A1 | 3/2007 | Shimizu |
| 2009/0071178 A1 | 3/2009 | Major et al. |
| 2010/0059208 A1 | 3/2010 | Nakamura |
| 2010/0136402 A1 | 6/2010 | Hermann et al. |
| 2010/0236846 A1 | 9/2010 | Kramer |
| 2011/0288708 A1 | 11/2011 | Katono et al. |
| 2013/0268151 A1 | 10/2013 | Bito |
| 2013/0284530 A1 | 10/2013 | Robinson et al. |
| 2013/0302653 A1 | 11/2013 | Pham et al. |
| 2014/0023905 A1 | 1/2014 | Taniyama et al. |

FOREIGN PATENT DOCUMENTS

| | | | |
|---|---|---|---|
| FR | 2987499 A1 * | 8/2013 | ........ H01M 10/0525 |
| JP | H05169981 | 7/1993 | |
| JP | H05193370 | 8/1993 | |
| JP | 10116635 A * | 5/1998 | |
| JP | 3381533 | 3/2003 | |
| JP | 2007311172 | 11/2007 | |
| KR | 100383975 | 5/2003 | |

\* cited by examiner

BATTERY TEMPERATURE REGULATING SYSTEM

BACKGROUND

Vehicles have traditionally incorporated one or more batteries for powering various components, including for starting an internal combustion engine and for running electrical components of the vehicle. Such batteries most efficiently supply power and/or charge when the temperature of the battery is within a standard or recommended temperature range.

Environmental factors such as surrounding air temperature as well as operating conditions of the battery such as load requirements, can influence the temperature of the battery to be outside the recommended temperature range, and can thereby reduce the efficiency of the battery in providing power and/or charging.

BRIEF DESCRIPTION

According to one aspect, a vehicle including a system for regulating a temperature of a battery of the vehicle is provided. The system comprises a fan which supplies airflow to the battery in accordance with the temperature of the battery and a speed of the vehicle. The fan operates to supply cooling airflow to the battery when (a) the temperature of the battery is above an extreme upper temperature threshold, or (b) the temperature of the battery is between an upper temperature threshold and the extreme upper temperature threshold, and the speed of the vehicle is below a speed threshold. The fan does not operate to supply cooling airflow to the battery when (a) the temperature of the battery is between the upper temperature threshold and the extreme upper temperature threshold and the speed of the vehicle is above the speed threshold, or (b) the temperature of the battery is below the upper temperature threshold.

According to another aspect, a method of regulating a temperature of a vehicle battery according to the temperature of the battery and a speed of the vehicle is provided. The method comprises providing a battery temperature regulating system configured to regulate airflow to the battery. The system comprises a fan capable of being selectively activated to rotate in a forward rotational direction or a reverse rotational direction for generating an airflow to the battery. The method includes operating the system to thereby generate airflow to the battery to regulate the temperature of the battery. The system actively generates airflow to the battery when (a) the temperature of the battery is above an extreme upper temperature threshold, (b) the temperature of the battery is between an upper temperature threshold and the extreme upper temperature threshold, and the speed of the vehicle is below a speed threshold, or (c) the temperature of the battery is below a lower temperature threshold and a temperature of the airflow is above the temperature of the battery. The system passively generates airflow to the battery during movement of the vehicle and none of (a), (b), and (c) are satisfied.

According to still another aspect, a method for regulating a temperature of a battery mounted on a motor vehicle is provided. The method comprises providing a temperature regulating system including a battery box, a duct, and a fan. The battery box defines an interior configured to house a battery. The duct has a first end connected to the battery box and a distal second end. The duct is in fluid communication with the interior of the battery box and configured to transport air from to the interior of the battery box. The fan is connected to the battery box and is in fluid communication with the interior of the battery box. The fan is selectively operable according to a speed of the vehicle and a temperature of the battery. The method also includes operating the fan to draw air through the duct and into the interior of the battery box when (a) the temperature of the battery is above an extreme upper temperature threshold, or (b) the temperature of the battery is between an upper temperature threshold and the extreme upper temperature threshold, and the speed of the vehicle is below a speed threshold. The method also includes deactivating the fan when (a) the temperature of the battery is between the upper temperature threshold and a lower temperature threshold or (b) the temperature of the battery is between the upper temperature threshold and the extreme upper temperature threshold and the speed of the vehicle is above the speed threshold. The duct is configured to supply cooling airflow to the battery during movement of the vehicle by transporting air that is rammed into the second end of the duct, through the duct, and into the interior of the battery box.

DETAILED DESCRIPTION

Figure 1:
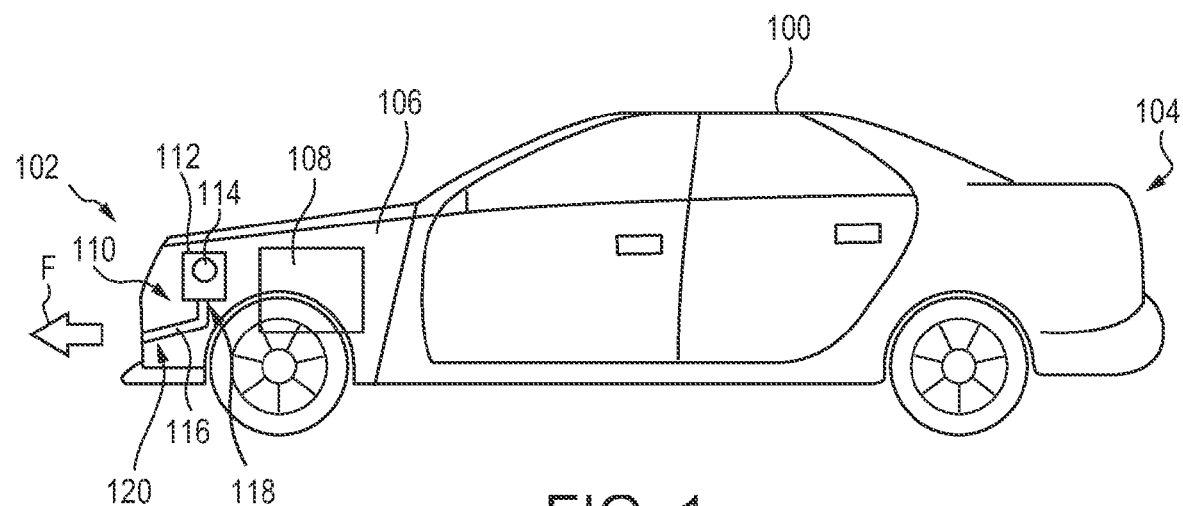
FIG. 1 is a schematic side view of a vehicle incorporating a temperature regulating system for a vehicle in accordance with the present subject matter.

In many motor vehicle applications, batteries have been placed under a front hood of the vehicle in an engine compartment near the engine, starter, alternator, and other electrical components of the vehicle. This placement of the battery in the engine compartment is often a result of convenience due to the electrical architecture of the vehicle. However, temperature fluctuations within the engine compartment that are above or below the recommended temperature range can negatively impact the efficiency of the battery.

Temperature fluctuation within the engine compartment may be due to heat generated by the engine, wherein temperatures in the engine compartment can become elevated above the recommended temperature range for the battery. Further, temperature fluctuation within the engine compartment may be due to the outside air temperature (i.e. air temperature of the ambient air in the environment surrounding the vehicle). If power is drawn from the battery, or if the battery is charged while the temperature of the battery is outside (i.e. above or below) the recommended temperature range, then in either scenario, internal components of the battery may begin to deteriorate and the battery life may be reduced.

In order to address this concern, attempts have been made to shield the battery from engine-generated heat that is present in the engine compartment. In order to accomplish this, batteries have been placed inside of closed or mostly closed boxes to help shield the battery from engine-generated heat. Additionally, insulation sleeves and/or partition walls have also been used to shied or separate the battery from engine compartment heat.

Although battery boxes and insulation sleeves may help to slow down heat transfer to the battery, at some point the insulation properties of these components may saturate, and the battery can nevertheless begin to heat above the recommended temperature range.

Other attempts to address these temperature fluctuations within the engine compartment have included using a duct to draw in air from outside the engine compartment and direct the air to the battery in order to cool the battery during movement of the vehicle. In this scenario, the battery is kept cool by the airflow through the duct and to the battery during vehicle movement. However, as the vehicle speed approaches zero, the forced airflow through the duct is diminished or ceases altogether, and the battery begins to heat up. Further, such configurations altogether fail to address situations where the battery temperature is below a recommended temperature range.

The apparatuses and methods disclosed herein are described in detail by way of examples and with reference to the figures. Unless otherwise specified, like numbers in the figures indicate references to the same, similar, or corresponding elements throughout the figures. It will be appreciated that modifications to disclosed and described embodiments can be made and may be desired for a specific application. Identifications of specific details or examples are not intended to be, and should not be construed as, mandatory or limiting unless specifically designated as such.

The present subject matter relates to a temperature regulating system that can be incorporated into a vehicle and is configured to regulate a temperature of a vehicle battery. The temperature regulating system generally includes a fan, a duct, and a battery box for housing the battery. These components function cooperatively in order to regulate the temperature of the battery by delivering airflow to the battery. The duct collects air from outside the engine compartment and with the fan, is collectively adapted to deliver the air to the battery box. The fan is selectively operable based on the temperature of the battery and a speed of the vehicle, in order to draw or drive air into to the battery box.

The airflow delivered to the battery may be a cooling airflow to reduce the temperature of the battery, or a warming airflow to increase the temperature of the battery. The airflow may be actively generated by operation of the fan to produce the airflow, or may be passively generated wherein the fan is not operated.

The airflow thus delivered to the battery urges the temperature of the battery to be within a standard or recommended operating temperature range. In a number of embodiments, the temperature regulating system is designed to be easily incorporated with typical battery mounting configuration and may be useful with commonly used battery tie down straps. In various embodiments, the temperature regulating system offers temperature regulation not only in warm conditions, but also in cold conditions wherein the temperature of the battery is below the recommended operating temperature range.

The temperature regulating system, its various components and their operations, and vehicles including the temperature regulating system will be discussed in more detail below.

Temperature Regulating System

In several embodiments, the temperature regulating system is adapted for regulating the temperature of a battery (e.g. a standard 12-volt battery) in an engine compartment of an automobile. However, the temperature regulating system can be incorporated into any type of vehicle, and can be used to regulate the temperature of any type of battery at any location in or on an associated vehicle. In this respect, the temperature regulating system can be utilized to regulate the temperature of other types of batteries that may be located other than in the engine compartment. Furthermore, it will be understood that the temperature regulating system can be used to regulate the temperature of any type of vehicle component, such an electronic components, that may be subject to, and/or is sensitive to variations of temperature, including vehicle components other than the battery and components other than those located in the engine compartment.

Figure 2:
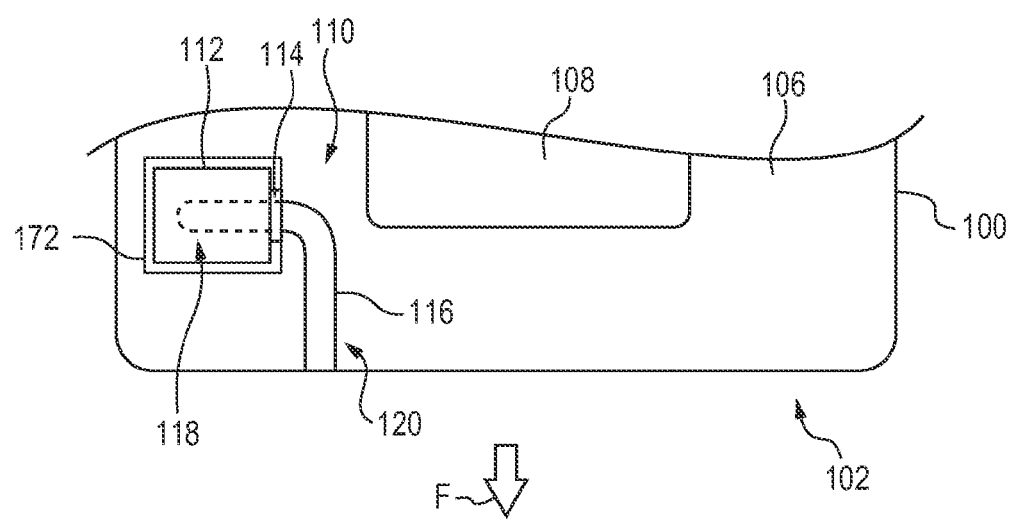
FIG. 2 is a schematic plan view of a front portion of the vehicle of FIG. 1 incorporating the exemplary temperature regulating system for a vehicle battery.

In one embodiment, and with reference to FIGS. 1 and 2, the exemplary temperature regulating system 110 is incorporated into an automobile-type vehicle 100 for regulating the temperature of a battery in an engine compartment 106. The vehicle 100 has a front 102 and a rear 104, and is configured to move in at least a forward direction F, indicated by the arrow. By "move in a forward direction" or other similar or related phrases, it is meant forward directional travel or movement of the vehicle 100 in a direction indicated by arrow F, wherein the front 102 of the vehicle 100 leads the rear 104 of the vehicle 100 during such forward movement. However, it will be understood that movement of the vehicle 100 may also comprise rearward movement of the vehicle 100.

The vehicle 100 includes an engine compartment 106 housing an engine 108, and is shown in FIGS. 1 and 2 to include the temperature regulating system 110 in accordance with the present subject matter. The temperature regulating system 110 includes a battery box 112 (i.e. container), a fan 114, and a duct 116. The battery box 112 is configured to house the battery. The fan 114 is configured to be selectively operable to provide a cooling airflow from outside the engine compartment 106 to the battery 126, or to provide a warming airflow from inside the engine compartment 106 to the battery 126. When the fan 114 is operated to provide airflow to the battery 126, such operation is referred to herein as "active," "active" airflow generation, or "active" operation of the fan 114.

Active operation of the fan 114 includes an "active cooling" operation, in which the fan 114 draws a cooling airflow through the duct 116, and to the battery box 112. Such air, drawn by the fan 114 during active cooling, is referred to herein as "active cooling air" or "active cooling airflow."

Active operation of the fan 114 may also include an "active warming" operation, in which the fan 114 drives a warming airflow from the engine compartment 106 into the battery box 112. Such air, driven by the fan 114 during active warming, is referred to herein as "active warming air" or "active warming airflow."

Figure 3:
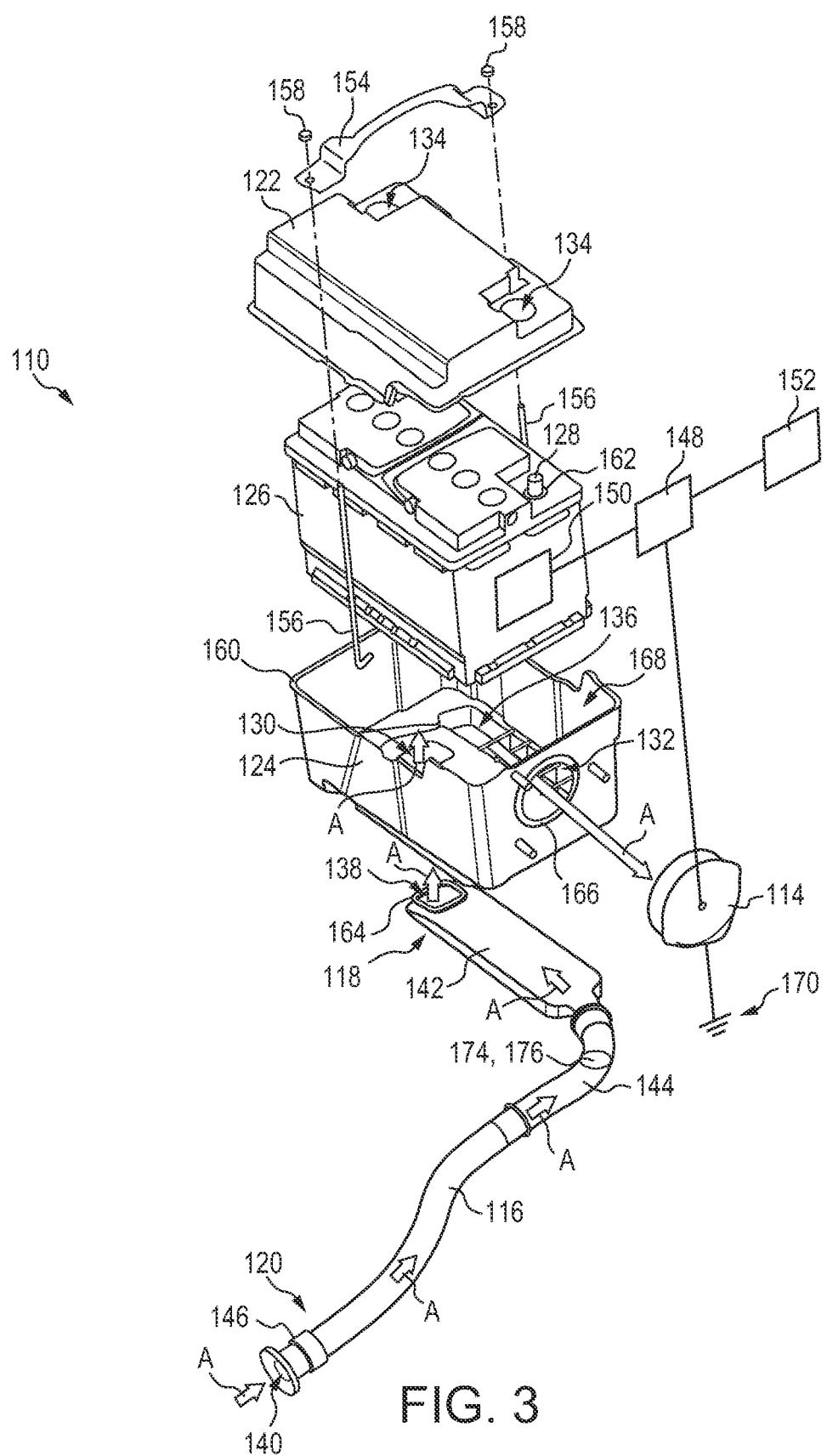
FIG. 3 is an exploded perspective view of the exemplary temperature regulating system for a vehicle battery.

With additional reference to FIG. 3, the duct 116 comprises a first end 118 and a second end 120, wherein the first end 118 is connected to the battery box 112 and the second end 120 is configured to collect air for delivery to the battery 126. In the embodiment shown in FIG. 3, the first end 118 of the duct 116 is connected to a bottom of the battery box 112 and the second end 120 is connected to the front 102 of the vehicle 100. It will be appreciated however, that the first end 118 and the second end 120 of the duct 116 may be connected to different portions of the battery box 112 and vehicle 100, respectively. The duct 116 is configured to supply a cooling airflow to the battery 126, either during active cooling, or when forward movement F of the vehicle 100 causes air to be forced through the duct 116 to the battery 126. Such air, forced into the duct 114 due to forward movement F of the vehicle 100, is referred to herein as "ram air." The process of delivering ram air to the battery 126 is referred to herein as "passive," "passive cooling," or "passively" generated airflow, or similar language because the fan is not being operated under power.

When a lid 122 and base 124 of the battery box 112 are brought together and sealed, and when the duct 116 and the fan 114 are mated with first 130 and second 132 apertures in the base 124 of the battery box 112, the system 110 is configured to regulate airflow within the battery box 112 as indicated, for example, by the airflow A depicted in FIG. 3. The airflow A depicted in FIG. 3 by arrows, will be understood to be a cooling airflow that may include ram air and/or actively generated cooling airflow delivered through the duct 116 into the battery box 112, around the battery 126, and out of the second aperture 132 and through the fan 114. In this way, it will be understood that the battery box 112 provides a space between the battery 126 and the box 112 itself, such that air delivered to an interior 168 of the battery box 112 can flow past the battery 126.

Battery Box

The battery box 112 of the exemplary temperature regulating system 110 may provide insulation for a battery 126 from heat present in the engine compartment 106 and generated by the engine 108. As can be seen in FIG. 3, the battery box 112 comprises two portions, e.g., a top portion 122 (i.e. the lid 122) and a bottom portion 124 (i.e. the base 124), which may be brought together (i.e. closed) to thereby define the interior 168 for housing the battery 126.

The depicted battery 126 comprises a standard 12-volt automobile battery. However, it will be understood that the battery 126 can comprise any type of battery including batteries of different sizes and voltages. In FIG. 3, the battery 126 is shown to include a battery terminal 128 for connection to an electrical system of the automobile 100, or other components thereof.

As will be understood the battery box 112 can be differently configured from that depicted in FIG. 3 in order to accommodate any size or type of battery, or to accommodate more than one battery. As such, the size and shape, and number of portions of the battery box 112 are not particularly limited but the present subject matter.

In one embodiment, the battery box 112 provides an air-tight seal around the battery 126 in order to better insulate the battery 126 from heat generated within the engine compartment 106. In one aspect, one of the base 124 and the lid 122, or both, form an airtight seal around their peripheral edges at location 160 as shown in FIG. 3, such that when the lid 122 and base 124 are brought together, an airtight seal can be formed between them. An air-tight seal around the battery 126 provides better insulation and shielding from heat in the engine compartment 106 and allows the temperature regulating system 110 to have a greater impact on the temperature of the battery 126.

In accordance with the present subject matter, the battery box 112 includes a first aperture 130 and a second aperture 132. The first aperture 130 may be located in a bottom surface, or any other surface of the battery box 112, and is configured to be mated with a first opening 138 at the first end 118 of the duct 116. Having the first aperture 130 at the bottom of the battery box 112 also allows contaminants, such as water or dirt for example, to easily exit the battery box 112 under the force of gravity. The second aperture 132 may be located in a side surface, or any other surface of the battery box 112, and may be configured to mate with the fan 114 or to accept the fan 114 within the second aperture 132.

The temperature regulating system 110 is configured to direct airflow in through one of the first 130 and second 132 apertures, and out through the other of the first 130 and second 132 apertures. Airflow within the battery box 112 will thereby travel between the first 130 and second 132 apertures and over the battery 126 in order to regulate the temperature of the battery 126. Again, in one embodiment, the first aperture 130 is located at the bottom of the base 124 of the battery box 112 and is mated with the first end 118 of the duct 116; and the second aperture 132 is located on a side surface of the base 124 of the battery box 112 and is mated with the fan 114, as depicted in FIG. 3. At these particular locations, airflow within the interior 168 of the battery box 112 can flow over substantially the entire surface of the battery 126 when traveling between the first 130 and second 132 apertures in order to efficiently regulate the temperature of the battery 126.

Further, the second aperture 132 may be located on a side of the battery box 112 closest to the engine 108. As shown in FIG. 2, the fan 114 is positioned on a side of the battery box 112 that is closest to the engine 108 in the engine compartment 106, such that when the fan 114 is operated to drive an active warming airflow from the engine compartment 106, the active warming airflow can taken from an area closest to the operating engine 108. In this way, heat can be scavenged more efficiently from the operating engine 108, as opposed to being scavenged from a side of the battery box 112 farther from the operating engine 108.

The location and size of the first 130 and second 132 apertures in the battery box 112 are not particularly limited by the present subject matter, and it will be understood that the first 130 and second 132 apertures can be located at different positions and can be differently sized and shaped as desired for a particular application.

In embodiments wherein the battery box 112 provides an airtight seal around the battery 126, the first 130 and second 132 apertures can be mated with the duct 116 and fan 114, respectively, in an air-tight manner so that airflow in the interior 168 of the box 112 cannot escape to the exterior of the box 112 through either of the first 130 or second 132 apertures. In this way, an airtight seal can be formed between the duct 116 and the first aperture 130 at location 164, and another airtight seal can be formed between the fan 114 and the second aperture 132 at location 166.

In one embodiment, the battery box 112 includes battery terminal openings 134 through which the battery terminals 128 are accessible for connection with an electrical system of the vehicle 100 or with various other components of the vehicle 100. In aspects where the battery box 112 provides an air-tight seal around the battery 126, the battery terminal openings 134 can be mated to the battery 126 at a location around the battery terminals 128 to provide an air-tight seal at location 162, such that air cannot escape from an interior 168 of the battery box 112 through the battery terminal openings 134 to an exterior of the battery box 112.

The battery terminal openings 134 are shown in FIG. 3 to have a particular size and shape, and are positioned to receive battery terminals 128 from a standard 12-volt automobile battery 126. However, it will be understood that the battery terminal openings 134 can be sized and shaped differently than that depicted in FIG. 3, and can be differently positioned. Further, the battery terminal openings 134 are not necessarily required by the present subject matter, and it will be understood that the battery box 112 may not include battery terminal openings 134. For example, battery terminal connectors and/or associated wiring can pass through the first aperture 130, the second aperture 132, other openings that can be included in the battery box 112, or between the lid 122 and the base 124 of the battery box 112.

The battery box 112 may also be configured to direct airflow around and over a surface of the battery 126 to more efficiently regulate the temperature of the battery 126. In this regard and in one embodiment, at least one of the base 124 and lid 122 of the battery box 112 includes one or more air guides 136 for guiding airflow within the sealed battery box 112. The air guide 136 can distribute air from one of the first aperture 130 and the second aperture 132, through various parts of the interior 168 of the battery box 112, and to the other of the first aperture 130 and the second aperture 132. The air guide 136 is adapted to efficiently cool and/or heat the battery 126 sealed within the battery box 112. The air guide 136 may include one or more vanes, baffles, indentations, or protrusions that are configured to direct or guide airflow within the battery box 112 so that airflow is more evenly distributed throughout the interior 168 of the battery box 112 and around the battery 126 for temperature regulating purposes. The air guide 136 of the battery box 112 may also comprise a stand-off portion, or otherwise be configured so as to provide space between the battery 126 and the interior surfaces of the battery box 112 when the battery box 112 is closed, in order to provide room for the air to circulate within and through the battery box 112 and around the battery 126. An exemplary air guide 136 is depicted in FIG. 3, as being part of the base 124 on the interior 168 surface of the battery box 112.

In several embodiments, the battery box 112 also includes insulation 172 on an exterior surface of the lid 122 and/or the base 124 as shown in FIG. 2. It will be understood that the insulation 172 can comprise any type of insulation that insulates the battery 126 from heat in the engine compartment 106. By locating the insulation 172 on the exterior of the battery box 112, the size of the battery box 112 may be relatively small while still providing space between the battery 126 and the interior 168 surfaces of the battery box 112. In this way, the insulation 172 will not interfere with proper air circulation in the interior 168 of the battery box 112 around the battery 126.

As depicted in FIG. 3, the temperature regulating system 110 can also include a hold down 154, two hold-down rods 156, and two hold-down fasteners 158. The hold down 154, the hold-down rods 156, and the hold-down fasteners 158 can be configured to maintain the battery 126, the battery box 112, and other components of the system 110 in a particular location relative to the vehicle 100 or vehicle frame, and can hold the lid 122 to the base 124 in order to maintain the airtight seal between them at location 160. The hold down 154, hold-down rods 156, and hold-down fasteners 158 are not particularly limited and as depicted, are conventional in nature and may be those included on any type of vehicle 100. It will be appreciated that the hold down 154, the hold-down rods 156, and the hold-down fasteners 158 can be differently configured in accordance with the present subject matter. In this way the system 110 of the present subject matter can be easily incorporated in any vehicle 100.

In this particular embodiment, the hold down 154 in conjunction with the rods 156 and fasteners 158 are configured to seal the lid 122 to the base 124 such that the battery 126 is contained in the interior 168 of the battery box 112. When the lid 122 and the base 124 are brought together and sealed in an airtight manner, the battery terminal openings 134 may also be mated to the battery 126 around the terminals 128 to form an airtight seal at location 162.

It will also be understood that the battery box 112 can include other features as desired. For example, the battery box 112 can include a handle for transporting the battery box 112 or removing the lid 122 from the base 124, a clamp for clamping the lid 122 to the base 124, or other various features that would not impair the functioning of the battery box 112 in regulating the temperature of a battery 126 located in the interior 168 thereof.

Fan

The fan 114 is selectively operable for moving air to the battery 126 to regulate the temperature of the battery 126; such operation being dependent on the battery temperature and the speed of the vehicle 100. In one aspect, operation of the fan may be dependent on the speed of the vehicle 100 in the forward direction F. In another aspect, operation of the fan may be dependent on the speed of the vehicle 100 in a rearward direction. It will be understood that when referring to a "fan", such component of the temperature regulating system 110 is meant to include vanes or blades that upon rotation or other movement can create a flow within a fluid (e.g. air); an optional motor for rotating the blades; and an optional case of frame for housing the blades and the optional motor. The type of fan 114 used in the temperature regulating system 110 is not particularly limited by the present subject matter, and can include any type of fan 114 including for example, axial fans, centrifugal fans, mixed-flow fans, or cross-flow fans. In one embodiment, the fan 114 also includes a sensor for detecting the temperature of air that flows through the fan 114.

The fan 114 is configured to be coupled with the second aperture 132 in the battery box 112, such as by fitting into, over, or behind the second aperture 132 in the base 124 of the battery box 112, for example. In another aspect, the fan 114 is configured to seal with or around the second aperture 132 in the base 124 of the battery box 112 such that an airtight seal is formed between the fan 114 and the battery box 112 at location 166.

The fan 114 is selectively operable to draw air through the duct 116, to the battery box 112, and expel the air from the interior 168 of the battery box 112 through the second aperture 132. The fan 114 is also selectively operable to drive air into the interior 168 of the battery box 112 through the second aperture 132. In one embodiment, the fan 114 can operate in a forward rotational direction, a reverse rotational direction, or can be deactivated (i.e. not operated).

In one embodiment, the forward rotational direction of the fan 114 is associated with actively producing a cooling airflow to the battery 126, wherein air is drawn through the duct 116, through the first aperture 130 to the interior 168 of the battery box 112, and expelled from the battery box 112 through the second aperture 132. In this aspect, the fan 114 creates low pressure in the interior 168 of the box 112 that will cause a cooling airflow to be drawn through the duct 116, which is then directed through the battery box 112 to cool the battery 126. In one aspect, where the duct 116 is connected to the front 102 of the vehicle 100, cooling air may be drawn from the front 102 of the vehicle 100.

In another embodiment, the reverse rotational direction of the fan 114 is associated with actively producing an active warming airflow to the battery 126, wherein air is driven into the interior 168 of the battery box 112 through the second aperture 132, flows through the interior 168 of the battery box 112, exits the interior 168 of the battery box 112 through the first aperture 130, and is expelled from the temperature regulating system 110 through the first opening 138 of the duct 116. In this aspect, the fan 114 creates high pressure in the interior 168 of the battery box 112 that will cause an active warming airflow through the battery box 112 to warm the battery 126, and which will exit the first aperture 130 of the battery box 112, flow through the duct 116, and will be expelled through the second end 120 in the duct 116.

In still another embodiment, in a deactivated condition, the fan 114 is able to freely rotate in either a forward or reverse rotational direction such that air can move in and out of the interior 168 of the battery box 112 through the second aperture 132, independently from active operation of the fan 114. In one aspect, the deactivated condition of the fan 114 is associated with a passively generated cooling airflow being supplied to the battery 126, wherein ram air is forced through the duct 116 due to movement of the vehicle 100 in a forward or rearward direction, through the battery box 112, and out of the second aperture 132. In another aspect, when the vehicle 100 is not substantially moving in a forward or rearward direction, ram air is not being forced into the duct 116. In this situation, and when the fan is in a deactivated condition, neither a cooling airflow nor an active warming airflow being supplied to the battery 126.

Although FIG. 2 depicts the fan 114 being directly connected to the battery box 112 (i.e., directly abutting the battery box 112) it will be understood that the fan 114 can be spaced from the battery box 112. For example, the fan 114 can include a duct or conduit that spaces the fan 114 from the second aperture 132 of the battery box 112. It will also be understood that the fan 114 can be positioned at other locations on the base 124 of the battery box 112 or on the lid 122 of the battery box 112.

As shown in FIG. 3, the fan 114 is connected to a power source 170, wherein the power source 170 provides power for rotating the fan 114 in a forward or reverse rotational direction during active operation of the fan 114. The power source 170 is not particularly limited, and can comprise the battery 126 housed within the battery box 112, an alternator of the vehicle 100, a battery separate from either of these two power sources, or other power source that is capable of powering the fan 114.

As described, the fan 114 is configured to selectively generate airflow within the battery box 112 to either actively cool or actively warm the battery 126 depending on the battery temperature and the speed of the vehicle 100.

Duct

The duct 116 is in fluid communication with the interior 168 of the battery box 112 and is configured to deliver cooling air to the interior 168 of the battery box 112 when the fan 114 is operating in a forward rotational direction, which draws air through the duct 116 to the interior 168 of the battery box 112. In one embodiment, the second opening 140 in the second end 120 of the duct 116 may be configured such that the duct 116 can supply cooling airflow to the battery 126, when the vehicle 100 in moving. That is, the duct 116 can supply cooling ram air to the battery 126 when the vehicle 100 is operating in either a forward or rearward direction and the fan 114 is deactivated; and can supply active cooling airflow to the battery 126 when fan 114 is operating in a forward rotational direction and the vehicle 100 is or is not moving. When the fan 114 is operating in a forward rotation direction and the vehicle 100 is moving, it will be understood that the active cooling airflow drawn by the fan 114 may include at least a portion of ram air supplied by the duct 116.

In several embodiments, the duct 116 is also configured to discharge active warming airflow from the temperature regulating system 110, such as for example when the fan 114 is operating in a reverse rotational direction to deliver an active warming airflow to the battery 126.

The duct 116 can comprise a elongated hollow structure, such as a tube for example of any one or more cross-sectional shapes or sizes and having the first end 118 defining the first opening 138 and the second end 120 distal to the first end 118 that defines the second opening 140. In one embodiment and as shown in FIG. 3, the duct 116 includes a flattened portion 142 having a substantially rectangular cross-sectional shape near the first end 118; and a tubular portion 144 having a substantially round cross-sectional shape near the second end 120.

The flat portion 142 at the first end 118 of the air duct 116 is configured to extend underneath the battery box 112 as shown in FIG. 3. The flat portion 142 of the duct 116 is flattened so as to sit underneath the battery box 112 while occupying a minimal amount of space but having a maximum amount of interior volume. This rectangular cross-sectional shape minimizes the space required for the temperature regulating system 110 within the engine compartment 106. The tubular portion 144 of the duct 116 is configured in one embodiment to extend to the front 102 of the vehicle 100 and attach thereto.

It will be understood that the configuration of the duct 116, and the orientation of the duct 116 in relation to other components of the temperature regulating system 110, are not particularly limited by the present subject matter, and can include other shapes, sizes, and configurations for the duct 116. As such, the flat portion 142 of the duct 116 can run underneath the battery box 112 from a different side of the battery box 112 than that depicted in FIGS. 2 and 3. For example, the duct 116 can extend underneath the battery box 112 to the first aperture 130 from a forward-directed position relative to the battery box 112, or from a rearwardly-directed position relative to the battery box 112. Alternatively, the first aperture 130 in the battery box 112 can be positioned at a bottom corner of the battery box 112, such that the duct 116 is connected to the bottom corner of the battery box 112 and does not sit underneath the battery box 112.

The various portions of the duct 116, including the flat portion 142 and the tubular portion 144, can be made from one unitary piece of flexible or rigid material, or can comprise separate portions that are joined together to form the duct 116. It will be understood that the various portions of the duct 116 may be sealed together in an airtight manner so that air introduced into the duct 116 will not escape from the temperature regulating system 110 through the duct 116. In particular, the duct 116 may be substantially or completely airtight along a length between the first opening 138 and the second opening 140.

The first end 118 of the duct 116 is configured to connect to the first aperture 130, which may be on the bottom of the battery box 112. In one embodiment, the first opening 138 of the duct 116 is configured to be sealed with or around the first aperture 130 in an airtight manner at location 164. In this way air is prevented from escaping through the seal formed between the duct 116 and the first aperture 130. The second end 120 of the duct 116 may be configured to attach to the front 102 of the vehicle 100. The second end 120 of the duct 116 can comprise a resilient member 146, for example a rubber flange or gasket, provided to accommodate movement of the duct 116 relative to the vehicle 100.

In one embodiment, the second opening 140 in the second end 120 of the duct 116 is substantially facing a forward direction of the vehicle 100. In this way during forward movement F of the vehicle 100, the battery 126 can be cooled by passive cooling and without requiring active operation of the fan 114. More particularly, when the vehicle 100 is moving in the forward direction F, air may be rammed or forced into the duct 116 through the second opening 140. The ram air will proceed through the duct 116 to the first end 118 of the duct 116 and exit the duct 116 through the first opening 138. The ram air will then enter the interior 168 of the battery box 112 through the first aperture 130 of the battery box 112, flow through the interior 168 of the battery box 112, and thereafter exit the battery box 112 through the second aperture 132 in the battery box 112 and past the fan 114. In this way, circulation of ram air through the temperature regulating system 110 may thereby proceed independently from active operation of the fan 114. In one aspect, the second end 120 of the duct 116 is attached to the front 102 of the vehicle 100, such that ram air may be drawn from the front 102 of the vehicle. In another embodiment, the second opening 140 in the second end 120 of the duct 116 may be open towards a rear of the vehicle 100, wherein cooling ram air is supplied through the duct 116 and to the battery 126 when the vehicle 100 is moving in a rearward direction.

When the fan 114 is operating in a forward rotational direction to bring an active cooling airflow to the battery 126, the circulation of active cooling air through the temperature regulating system 110 will proceed in a substantially similar manner as the circulation of ram air. In this scenario, when the fan 114 is operating to bring cooling air to the battery 126, air is drawn by the fan 114 through the second opening 140 in the duct 116. More particularly, air is drawn by the fan 114 through the duct 116, to the interior 168 of the battery 126 box 112, over the surface of the battery 126 to thereby cool the battery 126, and exiting the battery box 112 through the second aperture 132 in battery box 112. It will be appreciated however, that the cooling airflow generated during fan 114 operation in the forward rotational direction may include not only active cooling air, but may also include ram air, provided the vehicle 100 is moving to provide such ram air.

In one embodiment the fan 114 is configured to run in a reverse rotational direction to supply an active warming airflow to the battery 126, wherein the fan 114 drives warm air from the engine compartment 106 and into the interior 168 of the battery box 112 to thereby warm the battery 126. In one aspect, the duct 116 is configured to expel the active warming airflow from the temperature regulating system 110. More specifically, the duct transports the active warming airflow from the interior 168 of the battery box 112 and through the duct 116 to be expelled from the second end 120 of the duct 116.

In another aspect, the duct 116 can include a baffle, valve, or other airflow restricting component 174 as shown in FIG. 3, that may restricts airflow in one or both directions through the duct 116. The airflow restricting component 174 can be a valve that may be selectively closed when the fan 114 is providing an active warming airflow to the battery 126. In this example, the active warming airflow supplied by the fan 114 and exiting the second opening 140 of the duct 116 may be flowing in an opposite direction than the direction of flow of the ram air supplied during forward movement of the vehicle 100. By closing the airflow restricting component 174 in the duct 116, ram air normally supplied during forward movement of the vehicle 100 will not be forced into the battery box 112 through the duct 116.

Accordingly, efforts to actively warm the battery 126 with the active warming airflow may not be diminished by the introduction of cooling ram air during forward vehicle movement. In this embodiment, one of the battery box 112 and the duct 116 may also include an alternative venting mechanism 176 for venting the active warming airflow from the battery box 112. The venting mechanism may be selectively operable to vent the active warming airflow when the fan 114 is providing such active warming airflow and when the airflow restricting component 174 is closed to prevent the introduction of ram air into the battery box 112.

In this way, the venting mechanism 176 allows venting of the active warming airflow from the interior 168 of the battery box 112, while the airflow restricting component 174 prevents cooling ram air from being forced into the interior 168 of the battery box 112. In one embodiment, the venting mechanism 176 and the airflow restricting component 174 can be included in a single construction 174, 176 as shown in FIG. 3.

In another aspect, the airflow restricting component 174 can be closed when the battery temperature is within a standard operating temperature range and the temperature of the outside air is below the standard operating temperature range for the battery 126. In this way, the temperature of the battery 126 can be maintained within the standard operating temperature range and not be cooled by ram air that is below the standard operating temperature range.

As shown in FIG. 1, the first end 118 of the duct 116 is connected to the bottom of the battery box 112 and the second end 120 is attached to the front 102 of the vehicle 100. In this embodiment, the duct 116 extends towards the front 102 of the vehicle 100 at a downward angle, such that the second end 120 is at a height lower than the first end 118. This configuration, in conjunction with having the first aperture 130 in the battery box 112 being at the bottom of the battery box 112, allows for contamination, such as liquid or dirt that may be present within the battery box 112 or within the duct 116 to be expelled from the system under the force of gravity in a direction away from the battery box 112. In this aspect any water or fluids that may be introduced into the duct 116 or the battery box 112 can be efficiently delivered away from the battery box 112 and the battery 126.

Controller and Sensors

In accordance with the present subject matter and in several embodiments, the temperature regulating system 110 includes a controller for controlling operation of the fan 114, and also includes various sensors. The controller can be configured to automatically control activation or deactivation of the fan 114 and other component of the system 110, without any input from an operator of the vehicle 100.

In one embodiment and as shown in FIG. 3, the temperature regulating system 110 includes a controller 148, a battery temperature sensor 150, and a speed sensor 152 for the motor vehicle 100. In another embodiment, a sensor is included as part of the fan 114, for detecting the temperature of the airflow through the fan 114. For example, the sensor in the fan can be configured to detect the temperature of the active warming air that is being driven into the battery box 112 from the engine compartment 106 through the second aperture 132.

As schematically illustrated in FIG. 3 by interconnecting lines, the controller 148 is in communication with the battery temperature sensor 150, the speed sensor 152, and the fan 114 including the sensor for detecting the temperature of airflow through the fan 114. It will also be understood that the temperature regulating system can include other sensors to detect for example, the temperature of the outside air, and that the controller can be in communication with and control the combined airflow restricting component and venting mechanism 174, 176.

The battery temperature sensor 150 is configured to monitor the temperature of the battery 126 and communicate such information to the controller 148. The speed sensor 152 is configured to monitor the speed of the vehicle 100, such as by measuring wheel rotational speed or by using measurements from an accelerometer, and communicate such information to the controller 148. The battery temperature sensor 150 and the speed sensor 152 are also not particularly limited by the present subject matter and can include any sensors capable of communicating with the controller 148 or capable of sensing the temperature of the battery 126 and the speed of the vehicle 100.

The controller 148 is configured to communicate with the battery temperature sensor 150 and the speed sensor 152, and optionally with other sensors such as a sensor in the fan 114 for measuring the temperature of the active warming airflow, and to process the information from the sensors. The controller 148 is also in operative communication with the fan 114 for controlling operation of the fan 114. The controller 148 of the present subject matter is not particularly limited and can include any controller 148 capable of activating the fan 114 in forward or reverse rotational direction, deactivating the fan 114, and communicating with, receiving, and processing information from the battery temperature sensor 150 and the speed sensor 152, or other sensors.

In one particular aspect the controller 148 and the various sensors, along with the fan 114, comprise a local interconnect network (LIN), which can include a LIN master (e.g. the controller 148) in communication with one or more LIN slaves (e.g. the fan 114, the battery temperature sensor 150, and the speed sensor 152).

In one aspect, the controller 148 selectively activates the fan 114 in forward or reverse rotational directions or deactivates the fan 114, based on information from the battery temperature sensor 150 relating to the temperature of the battery 126, and on information from the speed sensor 152 relating to the speed of the vehicle 100.

Methods and Operation of the System

The present disclosure includes various methods for regulating a temperature of a battery 126 of a vehicle 100. In one embodiment, the method includes providing the temperature regulating system 110 configured to regulate airflow to the battery 126. The temperature regulating system 110 comprises the fan 114, the battery box 112, and the duct 116 as described herein. The temperature regulating system 110 may further include the controller 148, battery temperature sensor 150, and speed sensor 152 for the motor vehicle 100 as described herein. In its broadest sense, the temperature regulating system 110 is operated according to the temperature of the battery (BT) and the vehicle speed ($S_V$).

In one embodiment, the temperature regulating system 110 actively generates airflow (e.g. active cooling airflow or active warming airflow) to the battery 126 when (a) the temperature of the battery is above an extreme upper temperature threshold ($T_{EU}$); (b) the temperature of the battery is between an upper temperature threshold ($T_U$) and the extreme upper temperature threshold, and the speed of the vehicle is below a speed threshold ($S_T$); and (c) the temperature of the battery is below a lower temperature threshold ($T_L$) and the temperature of the airflow is above the temperature of the battery. Further, the temperature regulating system 110 passively generates airflow to the battery 126 when the vehicle 100 is moving and none of the above-described circumstances (a)-(c) are satisfied. In this embodiment, it will be understood that $T_{EU} > T_U > T_L$ and $S_T > 0$ km/h. In one aspect, the temperature regulating system 110 also passively generates airflow (e.g. ram air) when the speed of the vehicle is greater than 0 km/h.

Passive airflow generation may occur without regard to the temperature of the battery 126, or may be restricted to when the battery 126 is above the lower temperature threshold, for example by closing the airflow restricting component 174. During passive airflow generation, the temperature regulating system 110 provides ram air from the front 102 of the vehicle 100 and through the duct 116, into the interior 168 of the battery box 112 to thereby cool the battery 126 during forward vehicle movement. The ram air exits the interior 168 of the battery box 112 through the second aperture 132 and past the fan 114.

Passive generation of airflow to cool the battery 126 is due to the movement of the vehicle 100, such that ram air is forced into the second opening 140 at the second end 120 of the duct 116, which may be located at the front 102 of the vehicle 100.

The speed of the vehicle 100 will determine the magnitude of passive airflow forced through the duct 116 and into the interior 168 of the battery box 112. At lower speeds the magnitude of ram air introduced to the battery box 112 will be lower compared to the magnitude of ram air introduced into the battery box 112 at elevated vehicle speeds.

As will be understood, the ram air forced into the second opening 140 of the duct 116 will travel through the duct 116 to the first opening 138 in the duct 116 and thereby enter through the first aperture 130 into the interior 168 of the battery box 112. The passively generated airflow in the interior 168 of the battery box 112 will be directed or regulated by the air guide 136 located within the interior 168 of the battery box 112, and around the battery 126 to thereby cool the battery 126. After flowing past the battery 126, the ram air will exit the battery box 112 through the second aperture 132 and pass by the blades of the fan 114. The fan 114 can be freely rotatable in either rotational direction, such that air exiting the battery box 112 during passive airflow generation can easily exit the interior 168 of the battery box 112 through the second aperture 132 and past the fan blades.

During the generation of active airflow by the battery temperature regulating system 110, the fan 114 is activated in either a forward or a reverse rotational direction. When operated in a forward rotational direction, the fan 114 draws active cooling airflow into the duct 116 from the front 102 of the vehicle 100 and through the second opening 140 in the duct 116, wherein active cooling air travels through the temperature regulating system 110 in a substantially similar manner as does ram air. The active cooling airflow travels through the duct 116, through the first aperture 130 to the interior 168 of the battery box 112, and exits the battery box 112 through the second aperture 132 and past the fan 114.

Upon exiting the battery box 112, the air can be delivered either to the engine compartment 106, or in another aspect to various other components that may require an airflow for proper operation. These can include, for example, delivery of the airflow to an air intake manifold for an internal combustion engine.

When the fan 114 is operated in a reverse rotation direction, active warming air from the engine compartment 106 is driven into the interior 168 of the battery box 112 through the second aperture 132. The active warming air is directed around the battery 126 to warm the battery 126, and exits the battery box 112 through the first aperture 130. Upon exiting the first aperture 130 in the battery box 112, the active warming air travels through the duct 116 from the first end 118 to the second end 120, and exits the second opening 140 of the duct 116.

In another embodiment where airflow through the duct may be influenced by pressure from ram air, the temperature regulating system 110 may include the venting mechanism 176 that was previously described such that the active warming air is expelled through the venting mechanism 176, rather than through the second opening 140 of the duct 116. In this embodiment, the venting mechanism 176 can comprise a one-way valve for example, or any other type of valve including a flap of polymer material covering an aperture in the battery box 112 or duct 116. The venting mechanism 176 can be normally closed to provide an air-tight temperature regulating system 110, but can be activated by the controller 148 when an active warming airflow is supplied to the battery 126 in order to provide a venting port in the temperature regulating system 110 by which the active warming air can be expelled after warming the battery 126.

As such, active warming air supplied to the battery box 112 from the engine compartment 106 by reverse rotation of the fan 114 can be released in order to facilitate a desired amount of circulation. In this particular aspect, an airflow restricting component 174 can be associated with the duct 116 to prevent cooling ram air from being introduced into the battery box 112 from the second opening 140 in the duct 116 during forward movement F of the vehicle 100. Accordingly, active warming air produced by reversed rotation of the fan 114 may be the only airflow introduced into the interior 168 of the battery box 112 during an active warming airflow process.

Operation of the temperature regulating system 110 in accordance with the present disclosure is further indicated for example, in the following Table 1 showing operation of the fan 114 according to vehicle speed and battery temperature.

TABLE 1

Fan Operation Based on Vehicle Speed and Battery Temperature

|  |  | Vehicle Speed | |
| --- | --- | --- | --- |
|  |  | $S_v < S_T$ | $S_v > S_T$ |
| Battery Temperature | $BT > T_{EU}$ | Fan on (active cooling airflow) | Fan on (active cooling airflow) |
|  | $T_{EU} > BT > T_U$ | Fan on (active cooling airflow) | Fan off (passive cooling airflow) |
|  | $T_U > BT > T_L$ | Fan off (optional passive cooling airflow) | Fan off (optional passive cooling airflow) |
|  | $BT < T_L$ | Fan on (active wanning airflow) if active warming airflow temperature is greater than battery temperature | Fan on (active warming airflow) if active warming airflow temperature is greater than battery temperature |

Legend for Table 1
$S_v$: Vehicle Speed
$S_T$: Speed Threshold
BT: Battery Temperature
$T_{EU}$: Extreme Upper Temperature Threshold
$T_U$: Upper Temperature Threshold
$T_L$: Lower Temperature Threshold As seen in Table 1, when a vehicle speed ($S_v$) is less than a speed threshold ($S_T$) and when the battery temperature (BT) is greater than an extreme upper temperature threshold ($T_{EU}$), the fan 114 is on (i.e. active cooling) and providing active cooling airflow across the battery 126. The same is true when the vehicle speed is above the speed threshold ($S_T$). It will be understood that when the battery temperature is above the extreme upper temperature threshold, the fan 114 will be operating to provide active cooling airflow regardless of the speed of the vehicle 100.

When the battery temperature is between the extreme upper temperature threshold and an upper temperature threshold ($T_U$), operation of the fan 114 is dependent on vehicle speed. When the vehicle speed is less than the speed threshold, the fan 114 is operated in a forward rotational direction to provide active cooling airflow to the battery 126 (i.e. active cooling).

However, when the speed of the vehicle 100 is above the speed threshold, the fan 114 is not operating. Rather, the temperature regulating system 110 may generate passive cooling airflow (i.e. passive cooling) to the battery 126 by the supply of ram air forced into the duct 116 by forward movement F of the vehicle 100. In this aspect, the battery temperature is maintained without operation of the fan 114 and in accordance with the speed of the vehicle 100 being over the speed threshold.

As shown in Table 1, when the battery temperature is between the upper temperature threshold ($T_U$) and a lower temperature threshold ($T_L$), the fan 114 is off regardless of the speed of the vehicle 100. It will be understood that in one embodiment, when the speed of the vehicle 100 is greater than the speed threshold ($S_T$), the temperature regulating system 110 may nevertheless passively cool the battery 126 unless an airflow restricting component 174 within the duct 116 is closed.

When the battery temperature is below the lower temperature threshold (TO, the fan 114 is operated to provide an active warming airflow (i.e. active warming) to the battery 126, provided the temperature of the warming airflow is greater than the temperature of the battery 126.

In one embodiment, the fan 114 is operated to actively warm the battery 126, provided the temperature of the active warming airflow is above an active warming air temperature threshold. The active warming air temperature threshold may be a variable temperature that can be the same as the battery temperature for example, or may be a set temperature that is above the lower temperature threshold, and can be for example about 0-5° C.

This active warming operation is conducted independent of the speed of the vehicle 100. For example, if the temperature of the battery 126 is below a standard operating temperature, the fan 114 can be operated to provide an active warming airflow from the engine compartment 106. It will be appreciated however, that the fan 114 will not be operated to provide active warming airflow if the temperature of the active warming airflow is less than the battery temperature. This situation could occur, for example in a cool environment, where the temperature of the battery is elevated by an active warming airflow, and is maintained at a temperature greater than the air in the engine compartment 106 by the insulated battery box 112. At the same time, the temperature in the engine compartment 106 may cool off more rapidly after the engine 108 has been shut down due to the low environmental temperature and no insulation around the engine compartment. In this situation, the temperature in the engine compartment 106 may be lower than the battery temperature some time after cooling down begins. In this case, the fan 114 would not be operated to supply an active warming airflow from the engine compartment 106, because the cooler temperatures in the engine compartment 106 would not warm the battery 126.

Another embodiment in accordance with the present disclosure is depicted for example, below in Table 2.

TABLE 2

Fan Operation Based on Vehicle Speed and Battery Temperature

|  |  | Vehicle Speed | |
| --- | --- | --- | --- |
|  |  | $S_v < 20$ km/h | $S_v > 20$ km/h |
| Battery Temperature | BT > 70° C. | Fan on (forward rotational direction) | Fan on (forward rotational direction) |
|  | 70° C. > BT > 50° C. | Fan on (forward rotational direction) | Fan off (freely rotatable) |
|  | 50° C. > BT > 0° C. | Fan off (freely rotatable) | Fan off (freely rotatable) |

TABLE 2-continued

Fan Operation Based on Vehicle Speed and Battery Temperature

|  | Vehicle Speed | |
| --- | --- | --- |
|  | $S_v < 20$ km/h | $S_v > 20$ km/h |
| BT < 0° C. | Fan on (reverse rotational direction) if active warming airflow temperature is greater than battery temperature | Fan on (reverse rotational direction) if active warming airflow temperature is greater than battery temperature |

Legend for Table 2
$S_v$: Vehicle Speed
BT: Battery Temperature

Table 2 is substantially similar to Table 1, except that specific values for the extreme upper temperature threshold ($T_{EU}$), the upper temperature threshold ($T_U$), the lower temperature threshold ($T_L$), and the speed threshold ($S_T$) have been assigned. In Table 2, it will be understood that the speed threshold is indicated as being about 20 kilometers per hour (km/h), the extreme upper temperature threshold is about 70 degrees Celsius (° C.), the upper temperature threshold is about 50° C.; and the lower temperature threshold is about 0° C. As will be understood, either a temperature range between 50° C. and 70° C., or a temperature range between 0° C. and 70° C. may represent the recommended temperature range for operating the battery 126.

It will be appreciated that the present subject matter is not limited to these particular speeds and temperatures for the various thresholds as indicated in Table 2, which are include for example only; but that other speeds and temperatures can be established for these thresholds. In one aspect, the extreme upper temperature threshold ($T_{EU}$) is a temperature between 65° C. and 75° C. In another aspect, the upper temperature threshold ($T_U$) is a temperature between 45° C. and 55° C. In another aspect, the lower temperature threshold ($T_L$) is a temperature between −5° C. to 5° C. In another aspect, the active warming air temperature threshold is a temperature above the lower temperature threshold or is a temperature above the battery temperature. In another aspect, the speed threshold is a speed between 15 km/h and 25 km/h.

In one embodiment for example, the speed threshold ($S_T$), the extreme upper temperature threshold ($T_{EU}$), the upper temperature threshold ($T_U$), and the lower temperature threshold ($T_L$), can be variable values determined and selected for a particular type of battery, a particular type of vehicle, or based on other considerations.

Table 2 is similar to Table 1, wherein the fan 114 may be operated in either a forward rotational direction to provide active cooling airflow (i.e. active cooling), in a reverse rotational direction to provide active warming airflow (i.e. active warming), or not operated (i.e. passive cooling) to allow ram air to passively cool the battery 126. Such operation is again dependent on the speed of the vehicle 100 detected by the speed sensor 152, and the temperature of the battery detected by the battery temperature sensor 150.

As shown in FIG. 2, if the battery temperature is greater than 70° C., the fan 114 is on and rotating in the forward rotational direction no matter the speed of the vehicle 100. When the fan 114 is operated in this forward rotational direction, the temperature regulating system 110 provides active cooling airflow to the battery 126 to urge the temperature of the battery to below 70° C.

When the temperature of the battery is between 70° C. and 50° C. and the speed of the vehicle is less than 20 km/h, then the fan 114 is on and rotating in the forward rotational direction. This provides active cooling airflow to the battery 126 at vehicle speeds below 20 km/h, in order to urge the battery temperature below 70° C. or to maintain the battery temperature below 70° C. At these low vehicle speeds (e.g. <20 km/h) the flow of ram air to the battery 126 provided by passive cooling may not be sufficient to cool the battery 126 to below 70° C. Therefore, active cooling may be necessary at these low speeds, and as such, the fan 114 is operated in a forward rotational direction to provide active cooling airflow to the battery 126.

When the speed of the motor vehicle 100 is above 20 km/h, and the temperature of the battery 126 is between 70° C. and 50° C., the fan 114 is off and not actively generating active cooling airflow. In this situation, the speed of the motor vehicle 100 passively generates airflow to the battery 126, which may be sufficient to regulate the temperature of the battery to be between 70° C. and 50° C., or may be sufficient to cool the battery 126 to between 70° C. and 50° C.

As shown in Table 2, if the battery temperature is between 50° C. and 0° C., the fan 114 is off no matter the speed of the vehicle 100. In this situation, the temperature regulating system 110 is not providing active cooling for the battery 126, and the battery temperature may increase to be within a recommended temperature range of between 50° C. and 70° C., or may be maintained to be within a recommended temperature range of between 0° C. and 70° C. In one embodiment, the temperature regulating system 110 may include the airflow restricting component 174 in the duct 116, which can be closed when the battery temperature is between 50° C. and 0° C. or less, so that the battery 126 is not passively cooled by ram air supplied through the duct 116.

If the battery temperature is below 0° C., then the fan 114 is on regardless of the speed of the vehicle 100, and is operated in a reverse rotational direction to provide active warming airflow to the battery 126, provided the active warming airflow temperature is greater than the battery temperature or is greater than the battery temperature. In this situation, the temperature regulating system 110 provides active warming for the battery 126 so that the battery temperature is urged to be within a recommended temperature range of between 50° C. and 70° C., or between 0° C. and 70° C. In one embodiment, the temperature regulating system 110 may include the airflow restricting component 174 in the duct 116, which is closed during active warming to prevent ram air from being introduced into the interior 168 of the battery box 112; and may further include the venting mechanism 176 as previously described herein for venting the active warming airflow from the temperature regulating system 110.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter addresses many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scopes of the claimed subject matter, as expressed in the appended claims.

The invention claimed is:

1. A system for regulating a temperature of a battery of a vehicle, the system comprising:
   a fan configured to selectively supply airflow to a battery of a vehicle, operation of the fan being dependent on a temperature of the battery and a speed of the vehicle;
   wherein the fan supplies cooling airflow to the battery when (a) the temperature of the battery is above an extreme upper temperature threshold, and (b) the temperature of the battery is between an upper temperature threshold and the extreme upper temperature threshold, and the speed of the vehicle is below a speed threshold; and
   wherein the fan does not supply cooling airflow to the battery when (a) the temperature of the battery is between the upper temperature threshold and the extreme upper temperature threshold and the speed of the vehicle is above the speed threshold, and (b) the temperature of the battery is below the upper temperature threshold.

2. The system of claim 1, further comprising a battery box defining an interior configured to house the battery, the battery box including first and second apertures through which airflow is delivered to and vented from the interior of the battery box, the battery box defining an air-tight housing surrounding the battery except for the first and second apertures.

3. The system of claim 2, further comprising a duct in fluid communication with the interior of the battery box and configured to supply cooling airflow to the battery when the vehicle is moving in a forward direction, and when the fan is supplying cooling airflow to the battery.

4. The system of claim 3, wherein the duct is connected to the battery box to form an air-tight seal around the first aperture and wherein the fan is connected to the battery box to form an air-tight seal around the second aperture.

5. The system of claim 3, wherein the duct extends at a downward angle from the battery box to a front of the vehicle.

6. The system of claim 3, wherein:
   the fan does not supply airflow to the battery when the temperature of the battery is between the upper temperature threshold and a lower temperature threshold; and
   the fan supplies warming airflow to the battery when the temperature of the battery is below the lower temperature threshold and a temperature of the warming airflow is above the temperature of the battery.

7. The system of claim 6, wherein cooling airflow is supplied from outside an engine compartment of the vehicle and warming airflow is supplied from inside the engine compartment.

8. The system of claim 7, further comprising a controller configured to control operations of the fan in accordance with the temperature of the battery and the speed of the vehicle, and at least one sensor in communication with the controller, wherein:
   the at least one sensor is configured to detect the temperature of the battery, the speed of the vehicle, and a temperature of the warming airflow.

9. The system of claim 6, wherein the extreme upper temperature threshold is a temperature between 65° C. and 75° C., the upper temperature threshold is a temperature between 45° C. and 55° C., the lower temperature threshold is a temperature between −5° C. to 5° C., and the speed threshold is a speed between 15 km/h and 25 km/h.

10. The system of claim 6, wherein the warming airflow is supplied to the battery when the temperature of the battery is below the lower temperature threshold and the temperature of the warming airflow is above a warming airflow temperature threshold, which is a temperature above the lower temperature threshold.

11. The system of claim 3, wherein the first aperture and the second aperture are on different sides of the battery box.

12. The system of claim 6, further including an airflow restricting component configured to prevent cooling airflow from being supplied through the duct and to the battery when the fan is operated to provide warming airflow to the battery.

13. The system of claim 7, wherein the fan is configured to rotate in a forward rotational direction to draw cooling airflow through the duct and to the interior of the battery box and a reverse rotational direction to drive warming airflow from the engine compartment into the interior of the battery box.

* * * * *